United States Patent [19]

Slapsys

[11] Patent Number: 5,149,221
[45] Date of Patent: Sep. 22, 1992

[54] ANGLED CONNECTION OF SUSPENDED CEILING TEES

[75] Inventor: Michael Slapsys, Toronto, Canada

[73] Assignee: CGC Inc., Oakville, Canada

[21] Appl. No.: 802,278

[22] Filed: Dec. 4, 1991

[51] Int. Cl.$^5$ .............................................. F16B 9/00
[52] U.S. Cl. ................................... 403/201; 403/207; 403/254; 52/665
[58] Field of Search ............... 403/206, 207, 194, 201, 403/254; 52/665

[56] References Cited

U.S. PATENT DOCUMENTS

| 2,840,200 | 6/1958 | Wong | 403/347 |
| 3,093,221 | 6/1963 | Purdy | 52/665 X |
| 4,494,350 | 1/1985 | Sharp | 52/665 |

FOREIGN PATENT DOCUMENTS 1435157  5/1976  United Kingdom ................. 403/201

*Primary Examiner*—Andrew V. Kundrat
*Attorney, Agent, or Firm*—Carson, Armstrong

[57] ABSTRACT

A clip provides a method for securing suspended ceiling tees to each other at an angle, especially but not necessarily at an angle other than a right angle. The clip has a body portion, an integral first tab portion projecting from one end of the body portion, an integral second tab portion projecting from the other end of the body portion, and preferably two integral tongue portions projecting from the body portion along either side of the second tab portion. The connection is effected by cutting the end of the first tee to the desired angle, if it is not already at that angle, then punching a vertical slot in the web portion of the first tee at a specified distance from the cut end of the first tee, then inserting the first tab in that slot and folding it and the clip against the web portion, then folding the tongue portions around the end of the tee to secure the clip to the tee, then inserting and securing the second tab portion in a vertical slot punched in the web portion of the second tee at the desired connection location. The clip preferably has a hole therethrough in the area of the first tab portion, and a slot through the second tab portion, thereby weakening those areas to facilitate bending.

5 Claims, 4 Drawing Sheets

ANGLED CONNECTION OF SUSPENDED CEILING TEES

BACKGROUND OF THE INVENTION

This invention relates to means for securing suspended ceiling tees to each other at an angle, and especially but not necessarily at an angle other than a right angle.

In suspended ceilings, it is common to connect tees to each other at a right angle, especially cross tees to main runner tees. A main tee is one which is hung from the ceiling by conventional wire hangers; a cross tee is one which is supported between main tees by the main tees themselves. One manner of making the connection of a cross tee to a main tee, for example, is to use a pre-assembled cross tee having a clip which is riveted or otherwise permanently mounted to extend from the free end of the cross tee. The clip includes a tab which is adapted to pass through a slot provided in the web or vertical portion of the main tee. The tab interlocks with the web portion, and with the tab of a cross tee joining the main tee from the other side, if present, thereby securing the cross tee in place.

Connection at a right angle suits mos ceiling installations, and is by far the most common form of connection. However, in irregular rooms, angled corridors, and other unusual shapes, or where an unusual ceiling treatment is desired for architectural or aesthetic reasons, connection at 45 degrees or some other angle is frequently desirable.

To date, there has been no simple and effective way of effecting connections at an angle other than ninety degrees. The solution adopted tends to vary from installation site to installation site, and ranges from lashing the tees together with wire, to using rivets, brackets, screws or other such mechanical fastening means.

Although such methods work in most cases, they are invariably somewhat makeshift, and there is always a concern that there may be slight misalignment, which may affect the appearance of the ceiling. Subsequent removal for maintenance access may be complicated as well.

Furthermore, it is slightly embarrassing to those engaged in the manufacture and marketing of suspended ceiling systems to be unable to supply means for dealing effectively and efficiently with angled connections. It would be advantageous for a supplier to be able to provide a system components which would permit connection at any desired angle.

Another important factor to be taken into account is that the various makeshift solutions commonly used today invariably take more time than is optimum. The time required to make one makeshift connection may be trivial, but if there are hundreds or even thousands of connections to be made, then ease and efficiency of installation becomes very important.

It might be thought that the conventional means of fastening tees together at right angles could be used, simply by cutting the end of the flange portion of the tee at an angle. However, this is not possible except at angles close to ninety degrees, since either an end of the tee would be exposed, or the end would have to be out at an angle. To out the end at an angle, the cut would have to be made so far back from the end of the tee that the clip or tab would be cut off.

There is therefore a need for means to permit simple, effective, and efficient fastening of tees to each other at an angle, and particularly at angles other than ninety degrees. Preferably, although the connection means could be pre-mounted on the tee, it should be possible to also elect to make the connection on location.

SUMMARY OF THE INVENTION

It is thus an object of the invention to provide such means for connecting tees at any angle.

In the invention, the principle of using a clip is maintained, but it is a new form of clip which is particularly adapted to be secured to the end of the tee after the end of the tee has been cut to the desired angle. The clip provides an extended tab which projects beyond the end of the tee, to engage in a vertical slot in the other tee.

The clip has a body portion, an integral first tab portion projecting from one end of the body portion, an integral second tab portion projecting from the other end of the body portion, and preferably two integral tongue portions projecting from the body portion along either side of the second tab portion. The connection is effected by cutting the end of the first tee to the desired angle, if it is not already at that angle, then punching a vertical slot in the web portion of the first tee at a specified distance from the cut end of the first tee, then inserting the first tab in that slot and securing the clip against the web portion. In the preferred embodiment, that securing of the clip is effected by folding the tongue portions around the end of the tee. The second tab portion is then inserted in a vertical slot punched in the web portion of the second tee at the desired connection location.

Further features of the invention will be described or will become apparent in the course of the following detailed description.

It is a particular advantage of the invention that the clip can be easily mounted by installers in the field, with the aid of a simple punch to make the vertical slots in the we portions of the tees.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

The following description refers to use of the clip to join a cross tee to a main tee, but it should be clearly appreciated that the clips could also be used to join main tees to main tees, or cross tees to cross tees.

Figure 1:
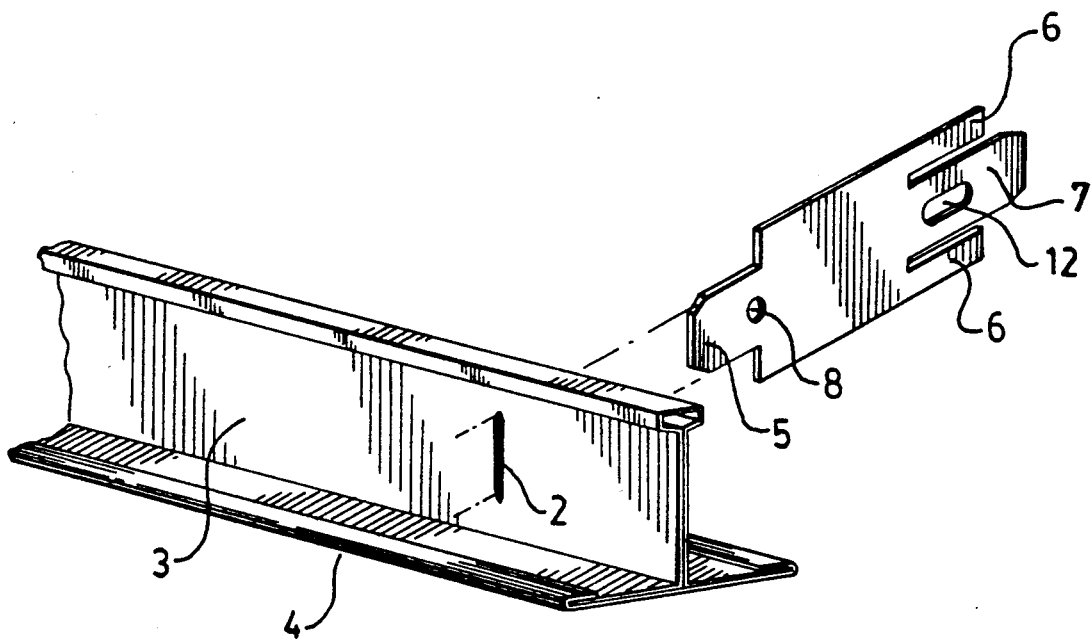
FIG. 1 is an exploded perspective view of the clip and a cross tee.
Figure 2:
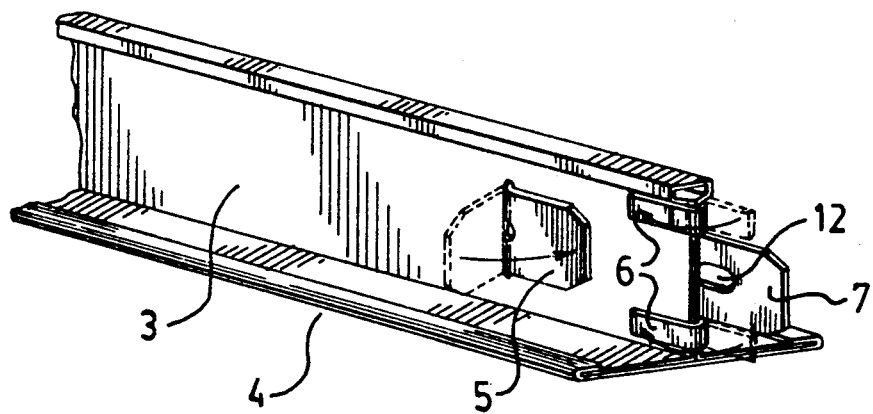
FIG. 2 is a perspective view corresponding to FIG. 1, with the clip installed on the end of the cross tee.

FIG. 1 shows the preferred embodiment of the clip 1, aligned for installation in a slot 2 in the web portion 3 of a cross tee 4 near the end thereof. The body of the clip has a first tab portion 5 extending therefrom which is inserted in the slot. The clip is then folded flat against web portion 3 as shown in FIG. 2, and the tab 5 is folded around against the opposite side of the web. At the other end of the clip are two fingers 6 which are then wrapped around the end of the cross tee as shown in FIG. 2, thus anchoring the clip in the correct position. This latter action exposes the second tab portion 7 which then extends beyond the end of the cross tee.

At the base of the first tab 5, a hole 8 is provided to weaken the clip in that area, to facilitate folding of the tab.

Figure 3:
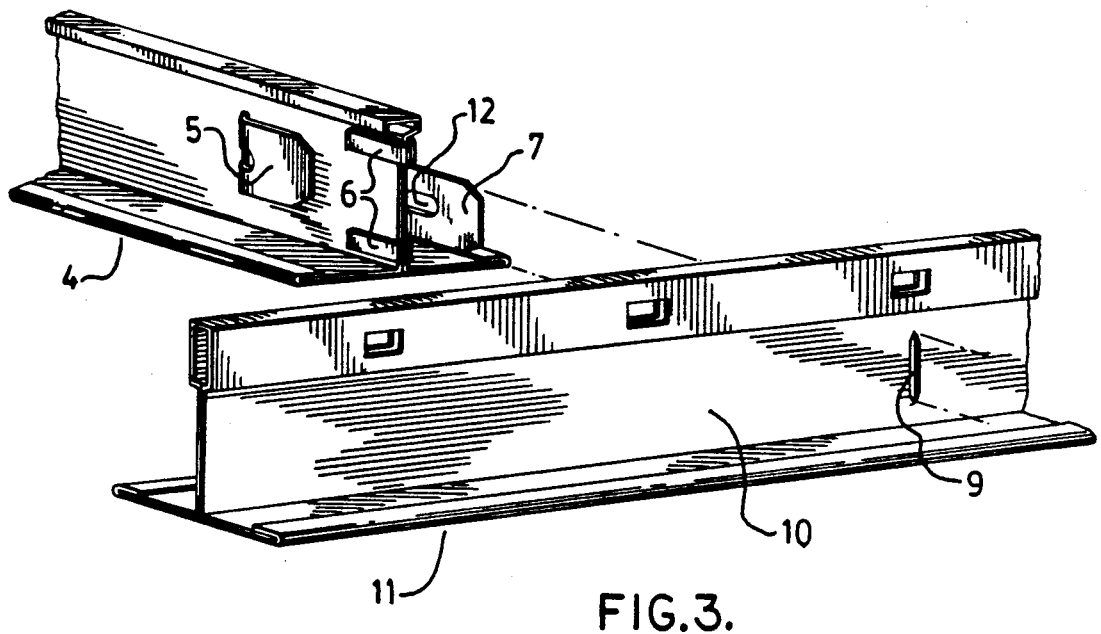
FIG. 3 is an exploded perspective view of the cross tee with the clip mounted on the end thereof, aligned with a slot in the main tee.
Figure 4:
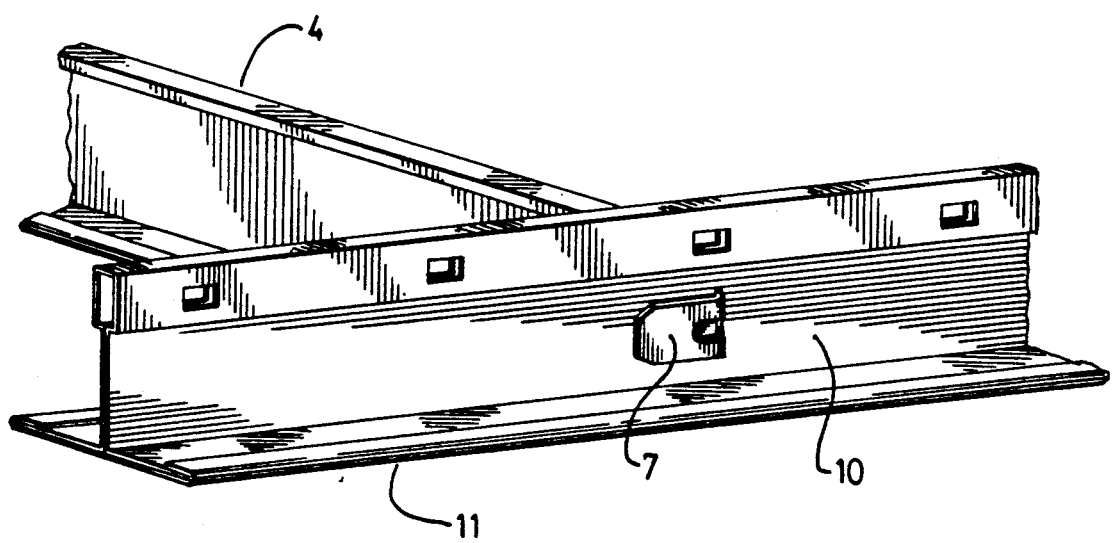
FIG. 4 is a perspective view corresponding to FIG. 3, with the cross tee connected to the main tee by the clip.
Figure 5:
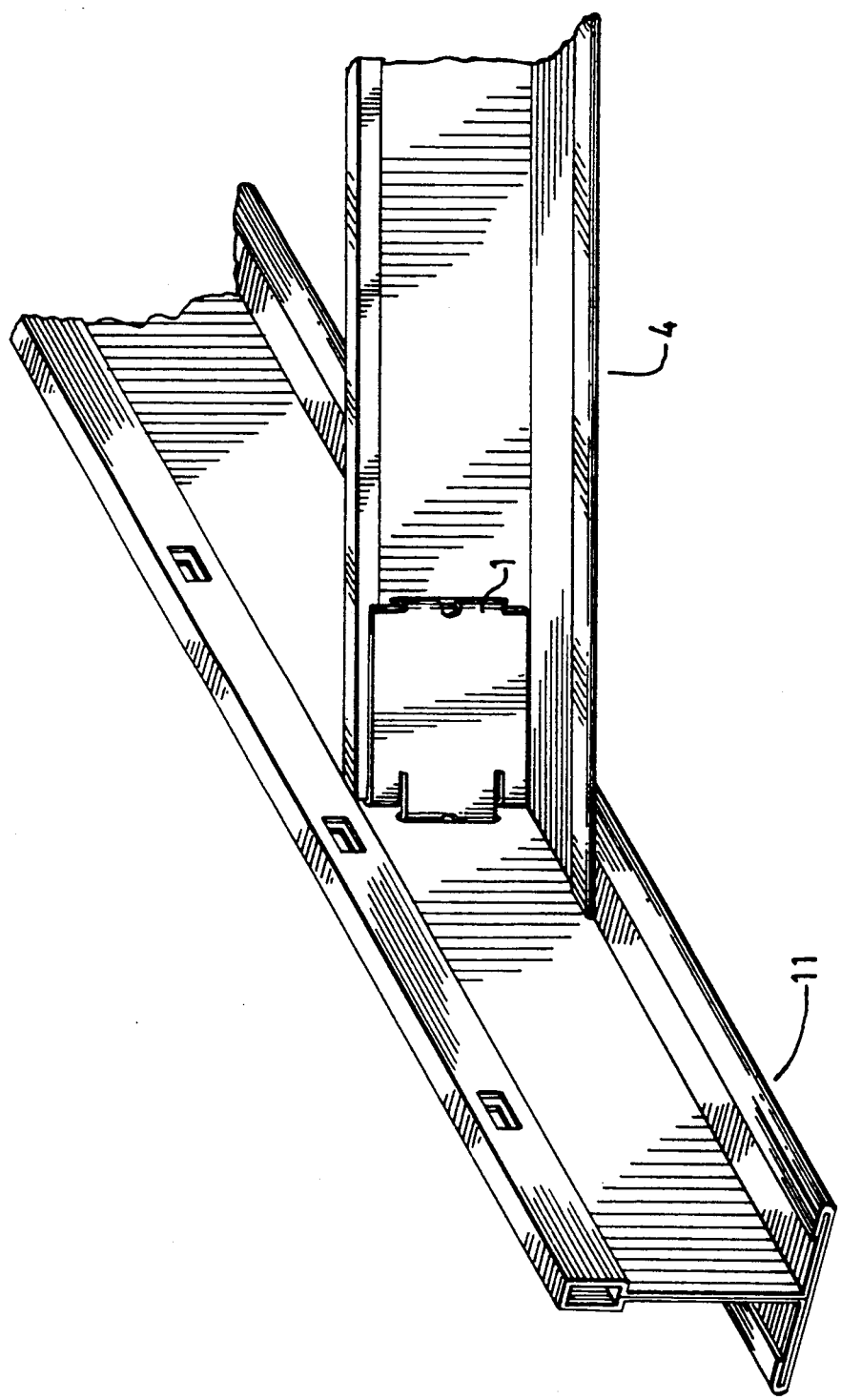
FIG. 5 is a perspective view of the completed connection, viewed from the other side of the main tee.
Figure 7:
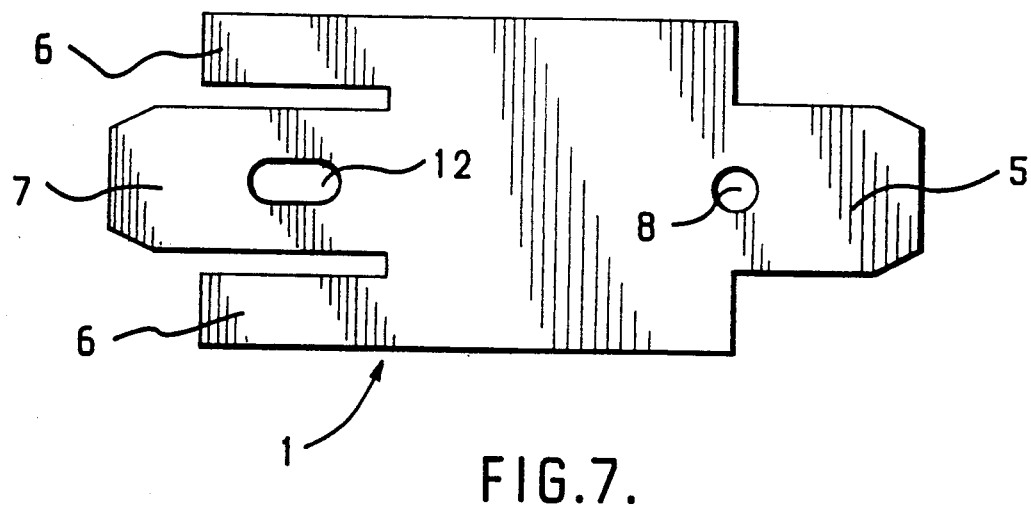
FIG. 7 is a plan view of the clip.

As seen in FIG. 3, the second tab portion 7 is intended to be inserted in a slot 9 provided in the web portion 10 of the main tee 11. As shown in FIGS. 4 and 5, the tab 7 is folded over against the web portion to thereby secure the cross tee in place.

Figure 6:
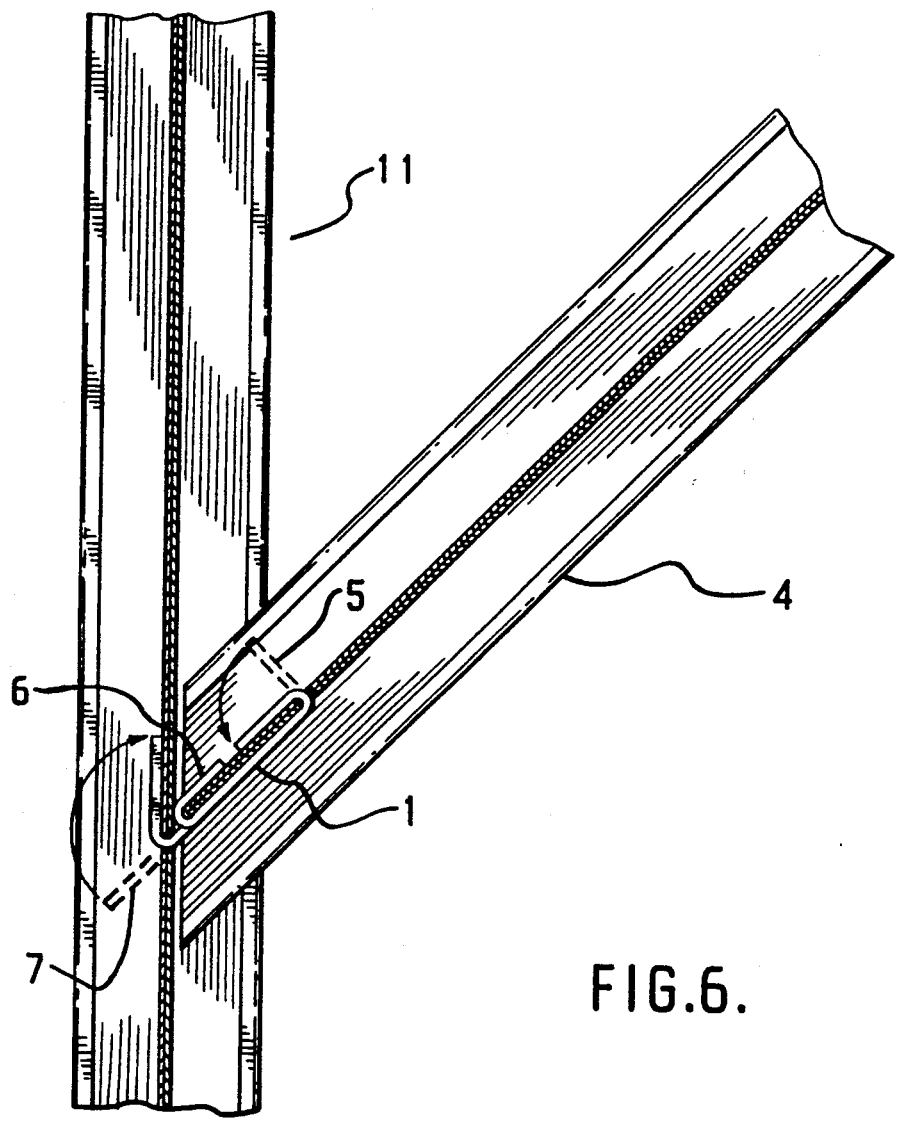
FIG. 6 is a top view of the connected tees.

FIG. 6 provides a clear illustration of how the clip 1 thus can be used to connect the cross tee 4 to the main tee 11 at an angle. The end of the cross tee is simply cut to the desired angle (if not already at that angle), a slot 2 is punched in the web portion 3 at the correct distance from the end to ensure that the tab 7 projects sufficiently beyond the end of the cross tee, the clip is installed on the cross tee, and the cross tee is then connected to the main tee 11 as described above.

Part way along the second tab portion 7, a slot 12 is provided. This serves a function similar to the hole 8 at the base of the first tab portion, by weakening the second tab in the area of the slot. A slot is employed rather than a hole, so that the tab can be bent at precisely the desired location, which may not always be at exactly the same position along the tab.

The clip may be of any suitable material, but preferably is of 0.015 inch galvanized steel. The choice of material involves ordinary skill in the art and is not considered to be part of the invention.

The dimensions of the clip may obviously be varied considerably within the scope of the invention. However, in the preferred embodiment, some key dimensions are as follows:

| Overall length: | | 2.187 inches |
|---|---|---|
| Width: | | 0.906 inches |
| First tab length: | | 0.500 inches |
| Second tab length: | | 0.750 inches |
| Width of both tabs: | | 0.468 inches |
| Finger length: | | 0.500 inches |
| Finger width: | | 0.219 inches |
| Diameter of hole 8: | | 0.125 inches |
| Dimensions of slot 12: | Length: | 0.250 inches |
| | Width: | 0.125 inches |

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, although it is important that some means such as the fingers 6 be provided to securely hold the clip in place once the tab 5 has been inserted through the web portion 3, any other suitable means could be employed to hold the clip securely against the web. For example, a rivet or screw could be used to secure the clip to the web once it is in the correct position.

Also, the tab 7, although intended to be folded over against the web portion of the runner tee, could be secured in place by any other suitable means. For example, the underside of the tab could be provided with a notch which could engage the web of the runner tee, or some other form of conventional mechanical fastening could be employed.

It should also be clearly appreciated that although the invention is intended to solve the problem of joining tees at 45 degrees or other angles substantially less than 90 degrees, there is no reason why the invention could not also be used to connect tees to each other at 90 degrees, if so desired.

What is claimed as the invention is:

1. A method of connecting the end of a first suspended ceiling tee to a second suspended ceiling tee at an angle, each said tee having a generally vertical web portion and a generally horizontal flange portion beneath and extending laterally on each side of said web portion, said method comprising the steps of:

cutting the end of said first tee to the desired angle, if it is not already at that angle, such that said end will be generally parallel to said second tee;

then punching a vertical slot in the web portion of said first tee at a specified distance from the cut end of said first tee;

then securing a clip against said web portion of said first tee, said clip having a first tab portion positionable in said vertical slot to locate said clip and a second tab portion adapted to extend beyond said cut end when said slot in said web portion of said first tee is at said specified distance from the end of said cut end;

then inserting and securing said second tab portion in a vertical slot punched in said web portion of said second tee at the desired connection location, and securing it by folding said second tab portion against the side of said web portion remote from said first tee.

2. A bendable clip for connecting the end of a first suspended ceiling tee to a second suspended ceiling tee at an angle, where each said tee has a generally vertical web portion and a generally horizontal flange portion beneath and extending laterally on each side of said web portion, said clip comprising:

a body portion;

an integral first tab portion projecting from one end of said body portion for insertion in a vertical slot in said web portion of said first tee;

an integral second tab portion projecting from the other end of said body portion for insertion in a vertical slot in said web portion of said second tee;

the width of said tabs being less than the width of said body portion; and means for securing said clip against said web portion of said first tee with said first tab in said vertical slot in said web portion of said first tee and with said second tab projecting beyond the end of said first tee, said means comprising two integral tongue portions projecting from said body portion alongside said second tab portion, each said tongue portion being bendable around the end of said first tee, one on either side of said second tab.

3. A clip as recited in claim 2, in which said body portion has a hole therethrough in the area of said first tab portion, thereby weakening the clip in that area to facilitate bending of said first tab portion with respect to said body portion.

4. A clip as recited in claim 2, in which said second tab portion has a slot therethrough, thereby weakening that area of said second tab portion to facilitate bending of said second tab portion.

5. A clip as recited in claim 2, in which said body portion has a hole therethrough in the area of said first tab portion, thereby weakening the clip in that area to facilitate bending of said first tab portion with respect to said body portion, and in which said second tab portion has a slot therethrough, thereby weakening that area of said second tab portion to facilitate bending of said second tab portion.

* * * * *